(12) United States Patent
Bishop

(10) Patent No.: US 8,577,412 B1
(45) Date of Patent: **\*Nov. 5, 2013**

(54) RETRACTABLE GRIP ATTACHMENT FOR A MOBILE PHONE

(71) Applicant: John L Bishop, Plano, TX (US)

(72) Inventor: John L Bishop, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,963

(22) Filed: Dec. 4, 2012

Related U.S. Application Data

(60) Continuation of application No. 13/572,627, filed on Aug. 11, 2012, now Pat. No. 8,385,974, which is a division of application No. 13/048,978, filed on Mar. 16, 2011, now Pat. No. 8,244,299.

(51) Int. Cl.
*H04M 1/00* (2006.01)

(52) U.S. Cl.
USPC .................. 455/556.1; 455/550.1; 455/575.1; 439/660

(58) Field of Classification Search
USPC .................. 455/556.2, 550.1, 575.7; 439/660
See application file for complete search history.

(56) References Cited

U.S. PATENT DOCUMENTS

| | | | |
|---|---|---|---|
| 7,703,224 B2 * | 4/2010 | Karlsson et al. | 37/457 |
| 7,861,985 B2 * | 1/2011 | Galvin | 248/160 |
| 8,265,326 B2 * | 9/2012 | Singh | 381/374 |
| 2004/0087335 A1 * | 5/2004 | Peiker | 455/556.2 |
| 2008/0125164 A1 * | 5/2008 | Singh | 455/550.1 |
| 2009/0093274 A1 * | 4/2009 | Yamamoto | 455/566 |
| 2009/0305572 A1 * | 12/2009 | Takamoto et al. | 439/660 |
| 2010/0009164 A1 * | 1/2010 | McFeely et al. | 428/320.2 |

* cited by examiner

*Primary Examiner* — Danh Le
(74) *Attorney, Agent, or Firm* — Michael Diaz

(57) ABSTRACT

A grip attachment for an electronic device for grasping and controlling a camera of the electronic device with one hand. The grip attachment includes a main body and a retractable enlarged grip extension attached to a first end of the main body. The main body is attached to the electronic device. The enlarged grip extension is sized and shaped to enable a user's hand to hold the grip extension and attached electronic device with one hand. The retractable enlarged grip extension includes a flexible grip segment which lies flat in a retracted position and forms an enlarged grip in a deployed position. The main body includes a connector for interfacing with a connector of the electronic device. The grip extension also includes an external control located on an outer surface of the grip attachment for activating a camera control of the electronic device.

18 Claims, 12 Drawing Sheets

RETRACTABLE GRIP ATTACHMENT FOR A MOBILE PHONE

RELATED APPLICATIONS

This application is a continuation in part application of a co-pending U.S. patent application Ser. No. 13/572,627 entitled "Grip Attachment For a Mobile Phone" filed Aug. 11, 2012 which is a divisional application and claims priority from U.S. Pat. No. 8,244,299 entitled "GRIP ATTACHMENT FOR A MOBILE PHONE" filed Mar. 16, 2011 by John Larry Bishop and is hereby incorporated by reference.

BACKGROUND OF THE INVENTION

1. Field of the Invention

This invention relates to electronic accessories. Specifically, and not by way of limitation, the present invention relates to a grip attachment providing camera control for an electronic device such as a mobile phone.

2. Description of the Related Art

With the advent of digital cameras, photography has become more popular than ever. Digital cameras enable users to take and store many photographs. Because of their compact size, digital cameras are easy to carry, thereby allowing many people to always have quick access to their cameras. However, as popular as digital cameras have become, mobile phones with their highly capable camera functions, have literally changed photography in a completely different way. These camera phones are capable of taking high resolution photos and incorporate many photographic features found on most digital cameras. Touch screen telephones are particular popular whereby a user interfaces with the camera by using the touch screen. However, these touch screen camera phones suffer from several disadvantages. First, a user cannot easily hold a phone with just one hand when taking photographs or video segments. With touch screen phones, a user usually uses both hands where the user's first hand holds the camera while the user's second hand manipulates the camera functions by touching the touch screen. This is a very cumbersome process where a user typically uses both hands to take a photograph. Many traditional cameras, prior to mobile camera phones, often used a hand grip located on one side of the main body of the camera. Oftentimes, the hand grip incorporated a shutter release on the hand grip which enabled a user to grasp and take a photograph with just one hand. It would be advantageous to have an apparatus which enables a user to conveniently take a photograph or video from a mobile phone with just one hand.

There are existing phone cases which enable a user to take a photograph by depressing a button on the case. However, none of these existing cases enables a user to easily grasp the camera body and take a photograph with just one hand. U.S. Pat. No. 8,244,299 to Bishop provides a grip attachment for a mobile phone which enables a user to grasp and control a camera function of the mobile phone with one hand. However, Bishop does not allow ease in carriage of the grip and mobile phone. In particular, with the grip attached to the mobile phone, the mobile phone is difficult to store in small areas, such as pockets.

It would be advantageous to have a hand grip adapter which is easily attached to a mobile phone and enables a user to manipulate the camera functions from the hand grip without touching the touch screen while simultaneously allow ease in carriage in small areas. It is the object of the present invention to provide such an apparatus.

SUMMARY OF THE INVENTION

The present invention provides a grip attachment for an electronic device which enables a user to grasp and control a camera of the electronic device with one hand. In one embodiment, the present invention is directed to a grip attachment for an electronic device. The grip attachment includes a main body and a retractable enlarged grip extension attached to a first end of the main body. The main body is attached to the electronic device. In addition, the enlarged grip extension is sized and shaped to enable a user's hand to hold the grip extension and attached electronic device with one hand. The retractable enlarged grip extension includes a flexible grip segment which lies flat in a retracted position and forms an enlarged grip in a deployed position. The main body includes a connector for interfacing with a connector of the electronic device. The grip extension also includes an external control located on an outer surface of the grip attachment for activating a camera control of the electronic device. The external control may interface with the mobile phone by utilizing a pin connector interface, a Bluetooth interface, sound module, Infrared Interface, or any other interface allowing the grip attachment to utilize a camera control of the electronic device.

DESCRIPTION OF THE INVENTION

Figure 1:
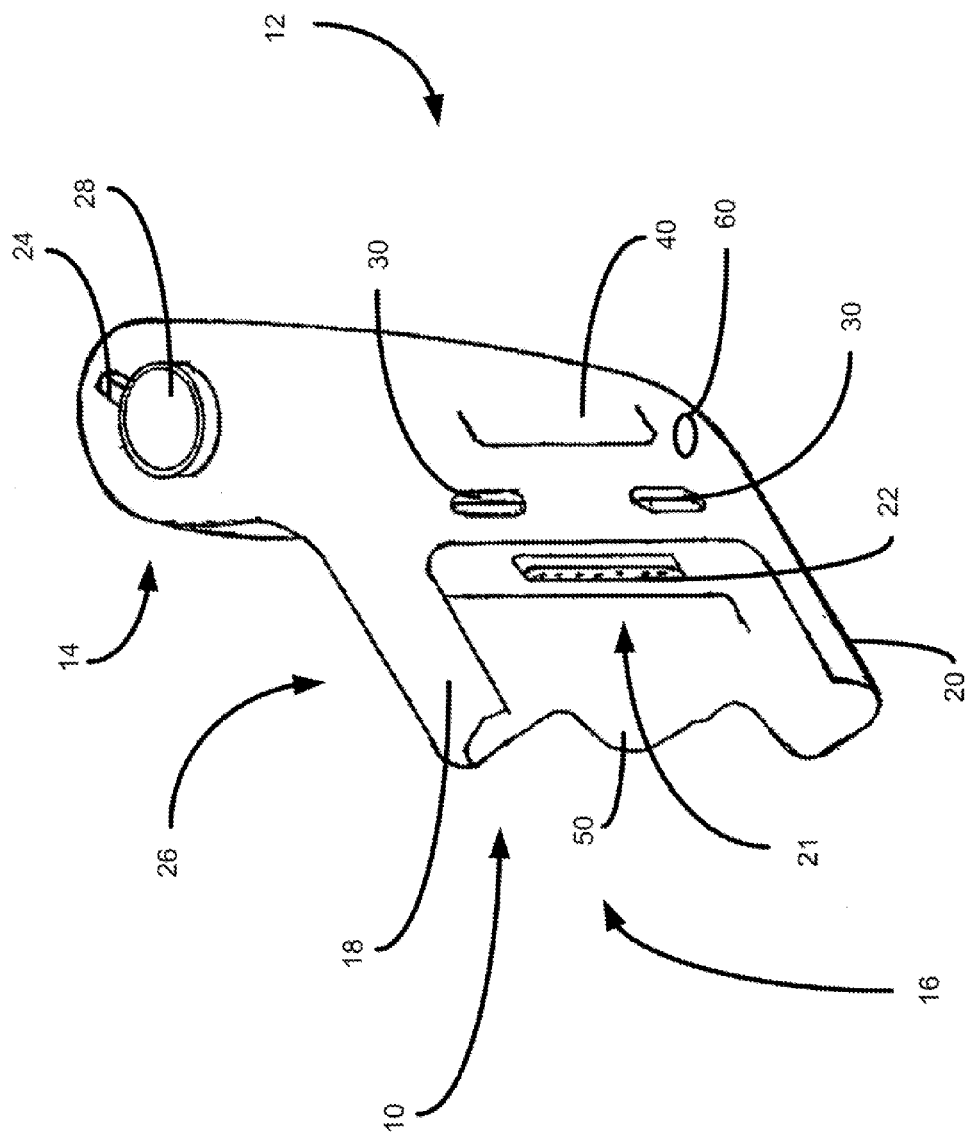
FIG. 1 is a top perspective view of a fixed grip attachment illustrated in U.S. Pat. No. 8,244,299.

FIG. 1 is a top perspective view of a fixed grip attachment 10 illustrated in U.S. Pat. No. 8,244,299. The grip attachment includes a main body 12 having an enlarged grip extension 14. The grip extension is sized and shaped to fit comfortably in a user's palm providing an enlarged surface area greater than a perimeter of a mobile phone. The grip attachment includes a slotted end 16 sized and shaped to accommodate a mobile phone upper end. The slotted end is bordered by side borders 18 and 20 and the grip extension 14. Within an interior space 20 of the slotted end is a pin connector 22 which is capable of receiving an end portion pin connector of the mobile phone. The pin connector may be any electronic pin connector, such as a standard male/female 30 pin connector utilized on many mobile phones. The grip attachment may include a shutter release button 24 located on a top side 26 of the grip extension 14. Furthermore, the grip extension may include an on/off button (not shown) and a zoom toggle switch 28.

The grip attachment 10 of FIG. 1 may also include pass-through openings 30 allowing sound passage to and from the mobile phone (e.g., microphone and speaker access from the mobile phone). The openings may include a baffling chamber to enhance sound or provide external speaker operation (e.g., a megaphone effect). The grip attachment may also include a pass through pin connector (or other type of connection device) 40 enabling connection of a cable connection for charging, downloading, flashcard adapter, phone syncing, etc., without removing the grip attachment 10 from the mobile phone. The grip attachment may include a case lock mechanism 50 for attachment to a partial mobile phone case which will be discussed below. The grip attachment may also include a wrist strap/lanyard attachment mechanism 60. A lanyard may be attached to the lanyard attachment mechanism to provide ease in transporting the grip attachment and mobile phone.

As discussed above, U.S. Pat. No. 8,244,299 to Bishop provides an innovative grip attachment for a mobile phone which enables a user to grasp and control a camera function of the mobile phone with one hand. However, Bishop does not allow ease in carriage of the grip and mobile phone. In particular, with the grip attached to the mobile phone, the mobile phone is difficult to store in small areas, such as pockets.

Figure 2:
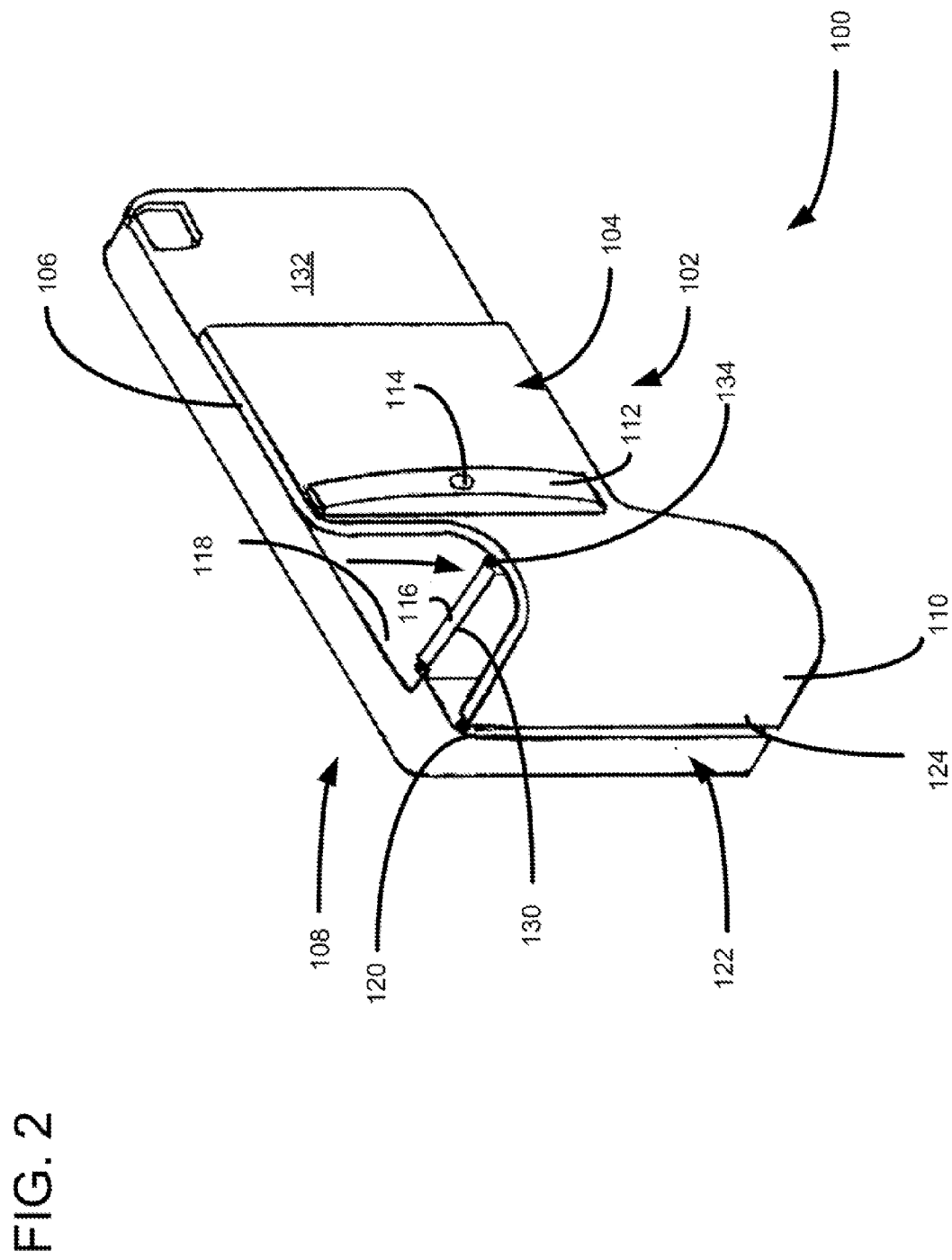
FIG. 2 is a front perspective view of a retractable grip attachment in a deployed position in one embodiment of the present invention.
Figure 3:
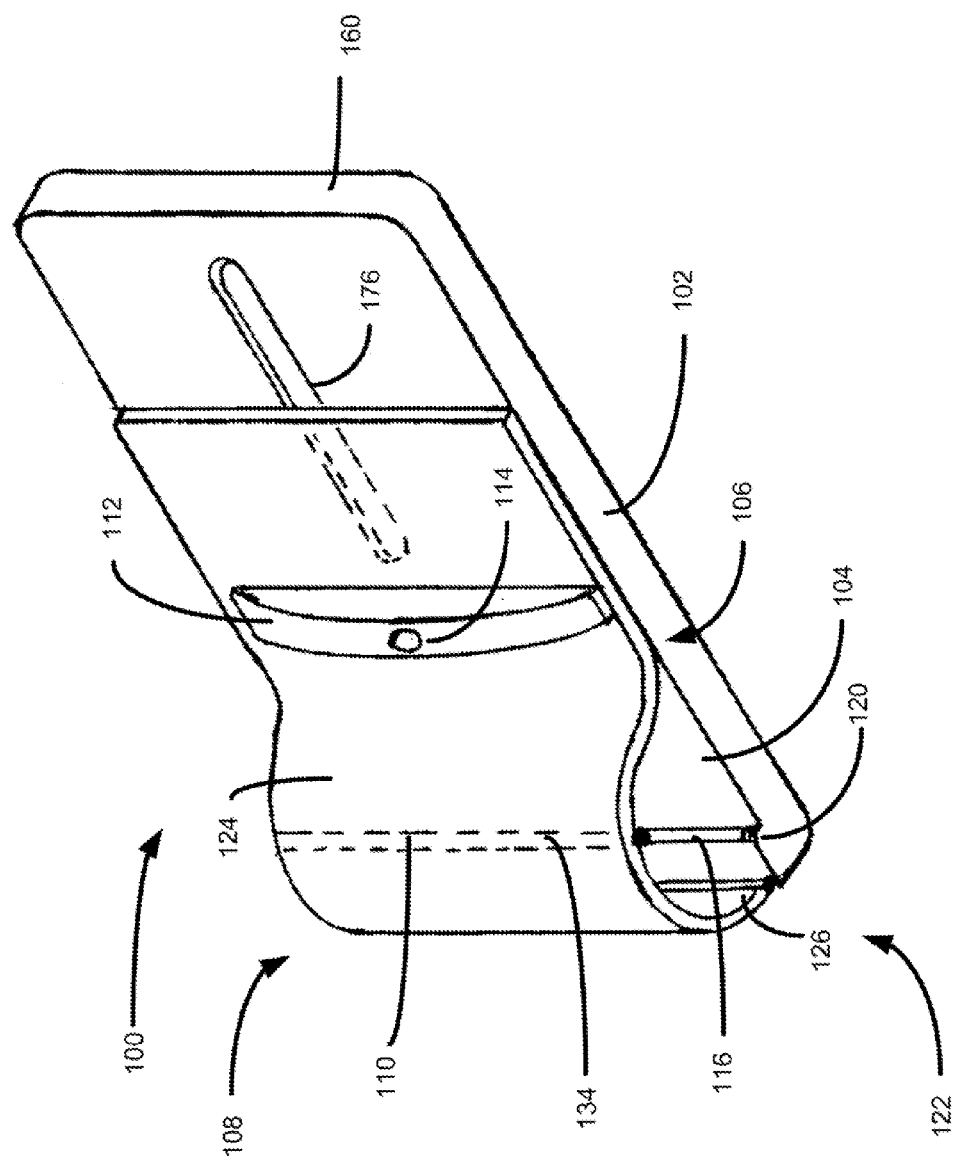
FIG. 3 is a second front perspective view of the retractable grip attachment of FIG. 2.

The present invention is a retractable grip attachment providing camera control of a mobile phone. The present invention provides the same functionality of the grip attachment of U.S. Pat. No. 8,244,299 in a retractable configuration. FIG. 2 is a front perspective view of a retractable grip attachment 100 in a deployed position in one embodiment of the present invention. FIG. 3 is a second front perspective view of the retractable grip attachment 100 of FIG. 2. The grip attachment includes a main body 102 having an outer side 104 and an inner side 106. The grip attachment includes a grip assembly 108, and a flexible grip segment 110 affixed to the outer side 104. In addition, a finger bar 112 is affixed to the flexible grip segment, and a push button lock 114. Furthermore, the grip attachment 100 includes a pivotable switch bar 116 located in between the grip segment 110 and an upper surface 118 of the main body. The pivotable switch bar pivots about pivot point 120. Additionally, the pivotable switch bar is attached to the underside of the grip segment 110 and pivots about pivot point 134. The flexible grip segment 110 in the retracted position lies flat against the upper surface 118 of the main body (not shown in FIGS. 2 and 3). In the deployed position, as shown in FIGS. 2 and 3, the flexible grip segment 110 is slid toward a first end 122. As the flexible grip segment is slid toward the first end 122, the excess material of the grip segment forms an enlarged grip 124. Additionally, the switch bar 116 lies flat with the flexible grip segment in the retracted position (not shown in FIGS. 2 and 3). In the deployed position, the switch bar pivots about pivot point 120 and pivot point 134 to provide additional support to the enlarged grip 124. At the top of the pivot switch bar is a switch button 130 which is utilized to activate a shutter button or other camera function of the electronic device to which the retractable grip attachment 100 is mated upon. The switch button may be multi-functional in that it may interface with the camera portion of the electronic device to zoom, switch between picture mode and video mode. In one embodiment, the present invention may use a multi-function switch bar using technology similar to a switching system used in an Apple® ear phone buds volume switch. The switch button may be used in either the deployed or retracted position.

The flexible grip segment is moved by using the finger bar 112 and push button lock 114. With the push button lock 114 depressed, the finger bar and the flexible grip segment 110 may slide toward the first end 122. In the deployed position, in one embodiment, the finger bar is located near the first end. The flexible grip segment 110 may be constructed of any flexible material, such as a "flexible" plastic, composites or metals. In addition, the present invention may utilize various types of hinge technology such as mechanical hinges, extruded materials, composites, or living hinge technology.

Figure 4:
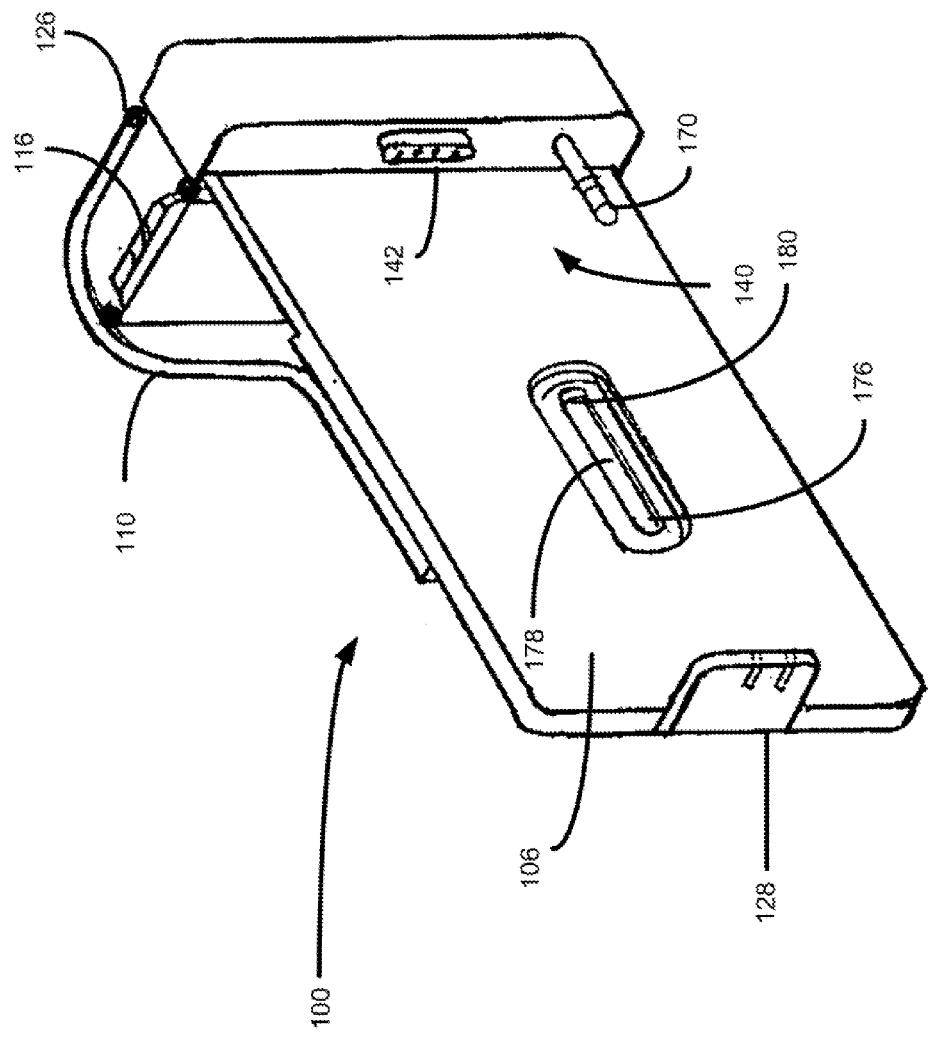
FIG. 4 illustrates a bottom perspective view of the retractable grip attachment for use on an existing phone case.

The main body is mated to an electronic device (not shown), such as a mobile phone. FIG. 4 illustrates a bottom perspective view of the retractable grip attachment 100 for use on an existing phone case. The flexible segment 110 is preferably attached to the main body 102 at a hinge point 126. The electronic device may communicate with the retractable grip attachment through either a wireless connection (not shown) or a mechanical connection 140 (shown in FIG. 4). In one embodiment, the mechanical connection may be a pin connector 142. The pin connector 142 enables an interface between the mobile phone and the external control (i.e., switch button 130). The mobile phone may receive a software application or "app" to provide the interface with the grip attachment. Although the grip attachment illustrates the switch button 130 for use as a shutter control of a camera, in other embodiments, the grip attachment may include other external control devices, such as a camera or video activation button. In addition, rather than utilizing a pin connector interface, the present invention may utilize other interface mechanisms. For example, the grip attachment may include a Bluetooth transmitter/receiver for interface with the mobile phone controls via a Bluetooth connection. In another embodiment, the grip attachment may interface with the mobile phone through an Infrared (IR) connection. In still another embodiment, the grip attachment may include a sound making module (electronic or mechanical). In this embodiment, the sound making module creates a sound which may be picked up by a microphone of the mobile phone. Upon hearing a specified sound, the mobile phone camera may take a photograph. In an electronic version of the sound making module, the sound making module may be DC powered through a pin connector arrangement or powered by a separate battery source. The mechanical interface may be any device which creates a sound (e.g., a clicker used by children). An application residing in the mobile phone may be used to match the emitted sound whereby the application reacts upon receiving a sound matching the exact frequency of the sound making module. Furthermore, it should be understood that any connector configuration may be used and still remain in the scope of the present invention, such as a mini or micro USB, Lighting connection, 30 pin, etc. In addition, the present invention may be configured for use with Apple's® audio connector for shutter control interfacing. New models of the iPhone® may be configured to release the shutter of the camera feature through this audio connector by pressing the "+volume" switch on the ear phone buds. In the embodiment depicted in FIG. 4, the electronic device is positioned against the inner side 106. In one embodiment, the grip attachment may include a retention tab 128 for retaining the electronic device upon the grip attachment 100. However, it should be understood that any retention device may be utilized to retain the grip attachment against the electronic device and still remain in the scope of the present invention.

Figure 5:
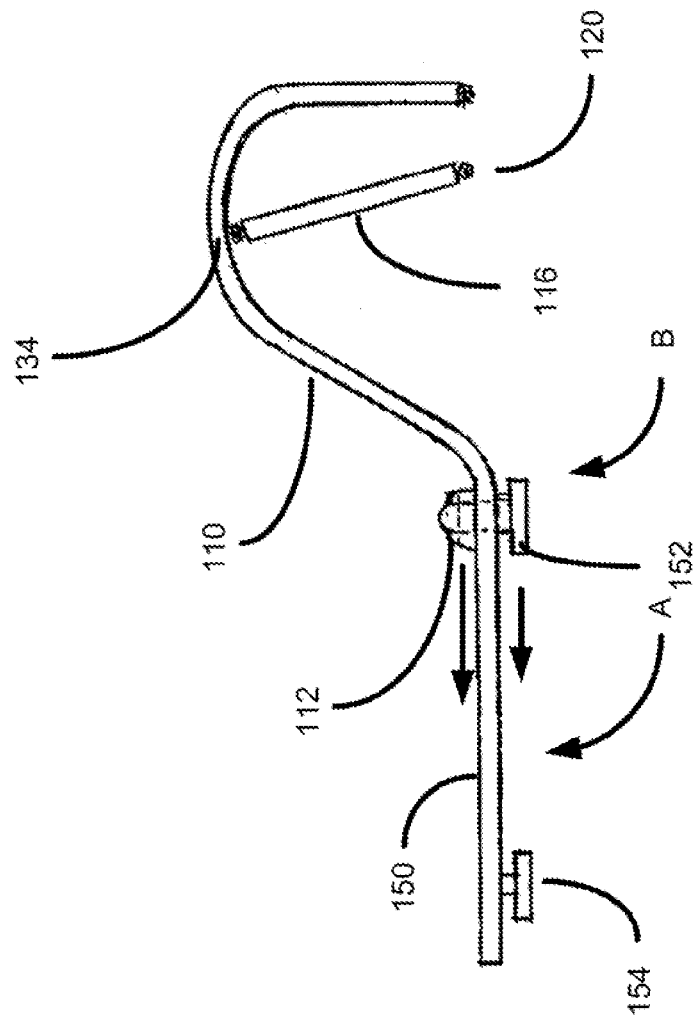
FIG. 5 is a side view of the flexible grip segment.

FIG. 5 is a side view of the flexible grip segment 110. The flexible grip segment includes the finger bar 112 which slides to the deployed position shown in FIG. 5. An underside 150 of the flexible grip segment 110 includes a locking guide 152 which may be slid from position A in the retracted position to position B in the deployed position. The locking glide is sized and shaped to fit within a slot (not shown in FIG. 5) running lengthwise along a portion of the flexible grip segment 110. The switch bar 116 is also illustrated with the pivot point 120 and pivot point 134. In addition, the flexible grip segment may include a support guide 154. In one embodiment, the support guide 154 does not include a lock and is utilized to support a tail end of the grip segment.

Figure 6:
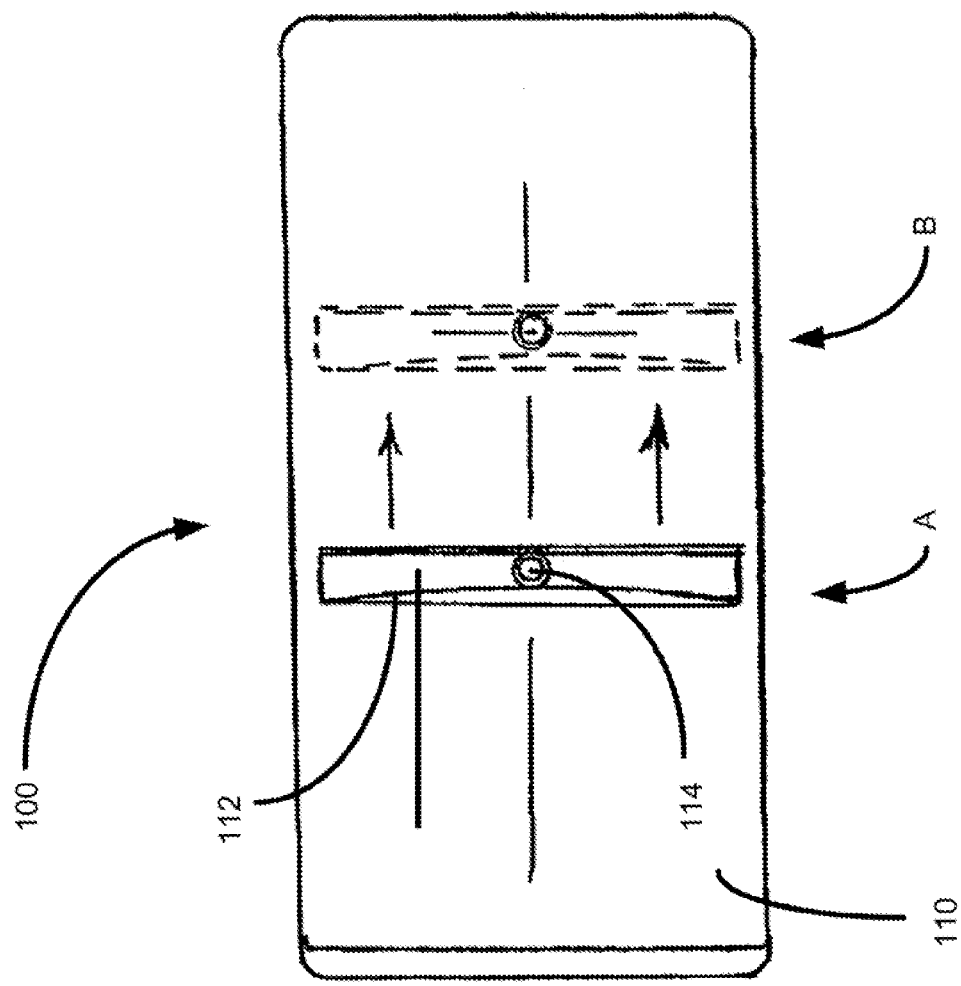
FIG. 6 is a top view of the flexible grip segment.

FIG. 6 is a top view of the flexible grip segment 110. The finger bar 112 is shown in position A for the retracted position and position B for the deployed position. In position A, the finger bar is located near second end 160. When deploying the enlarged grip 124, the finger bar and segment 110 is slide toward first end 122. The push button lock 114 enables the finger bar to be locked in either the deployed or retracted position.

Figure 7:
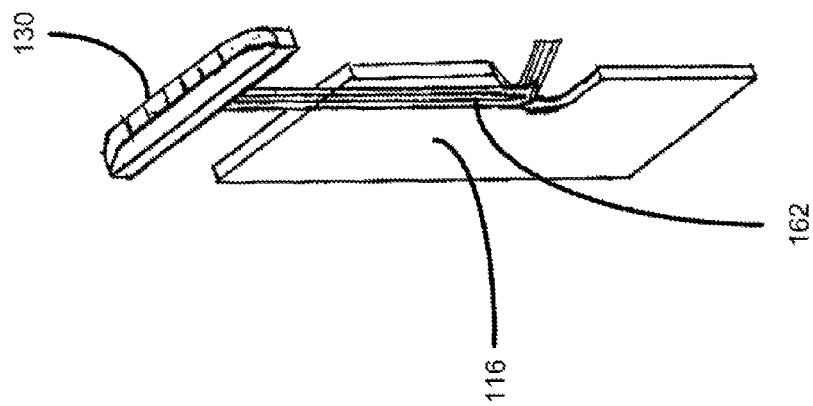
FIG. 7 is a front perspective view of the switch bar removed from the flexible grip segment.

FIG. 7 is a front perspective view of the switch bar 116 removed from the flexible grip segment 110. The switch bar is preferably sized and shaped to fit within a width of the main body of the flexible grip segment 110. The bar may include the switch button 130 (bar switch). On an inner side of the bar switch 116 is an inter-grip segment 162 communicating through the mechanical (or wireless connection) 140 with the electronic device. In one embodiment, the switch bar is constructed of a thin flexible conducting material.

Figure 8:
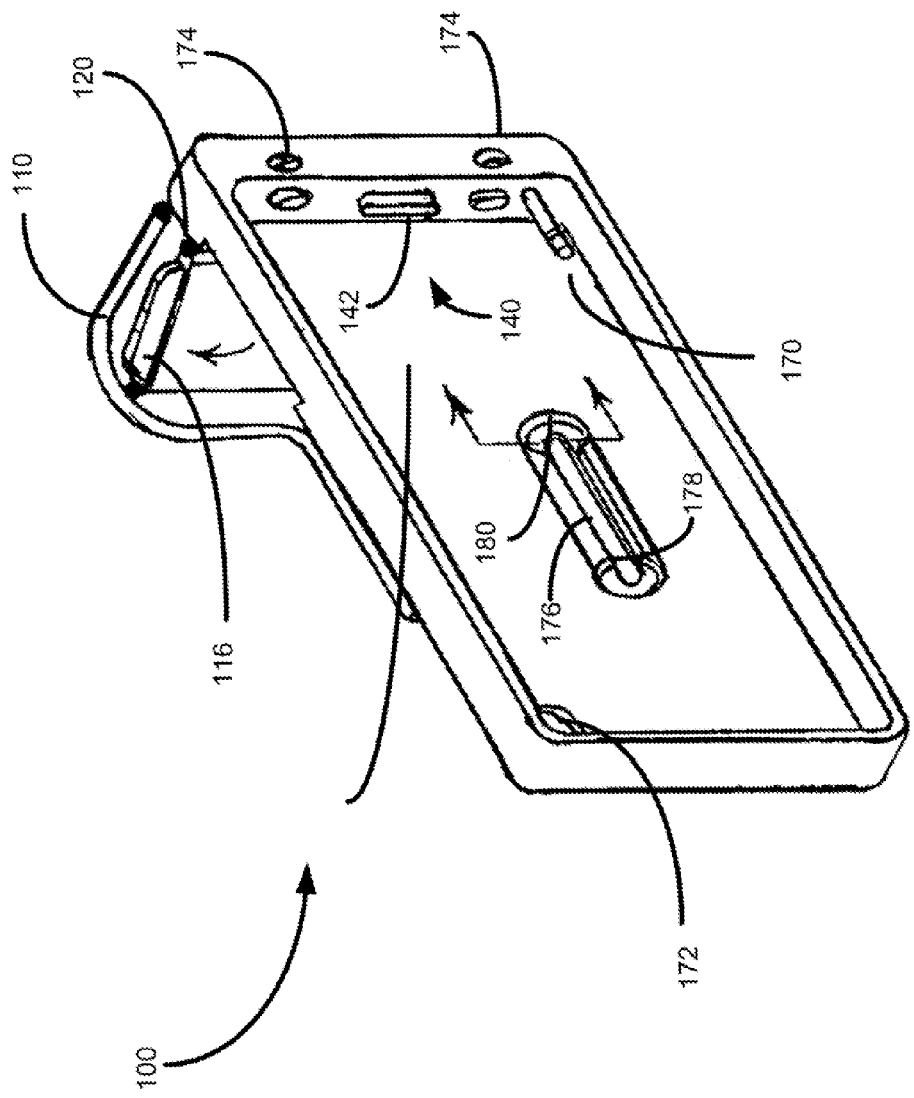
FIG. 8 is a rear perspective view of the grip attachment handle.

FIG. 8 is a rear perspective view of the grip attachment handle 100. The inner side 106 of the main body 102 includes a plurality of borders 164 surrounding a mating area 166 for receiving an electronic device. As depicted in FIG. 8, the mating area is sized and shaped for a mobile phone not having an existing case, but the mating area may be sized and shaped for an electronic device, such as an electronic tablet, a digital camera, etc. The mechanical connection 140 is depicted with pin connections 142 and an audio prong 170. The audio prong is a connector for insertion within an audio receiver on a mobile phone. In one embodiment, the present invention includes a cutout 172 for a lens of a camera. The cutout may be positioned where the camera lens on the electronic device is located to allow a clear view for the electronic device camera lens. Furthermore, the present invention may include sound passages 174 to allow sound emitted from the electronic device to pass through the grip attachment handle without any or little reduction in sound. A dove tail slot 176 may be located on the inner side 106 for the locking guide 152 and support guide 154 to slide within the slot. The slot may include a front lock detent 178 for use in locking the flexible grip segment 110 in the retracted position (position A) and rear lock detent 180 for locking the flexible grip segment in the deployed position (position B).

Figure 9:
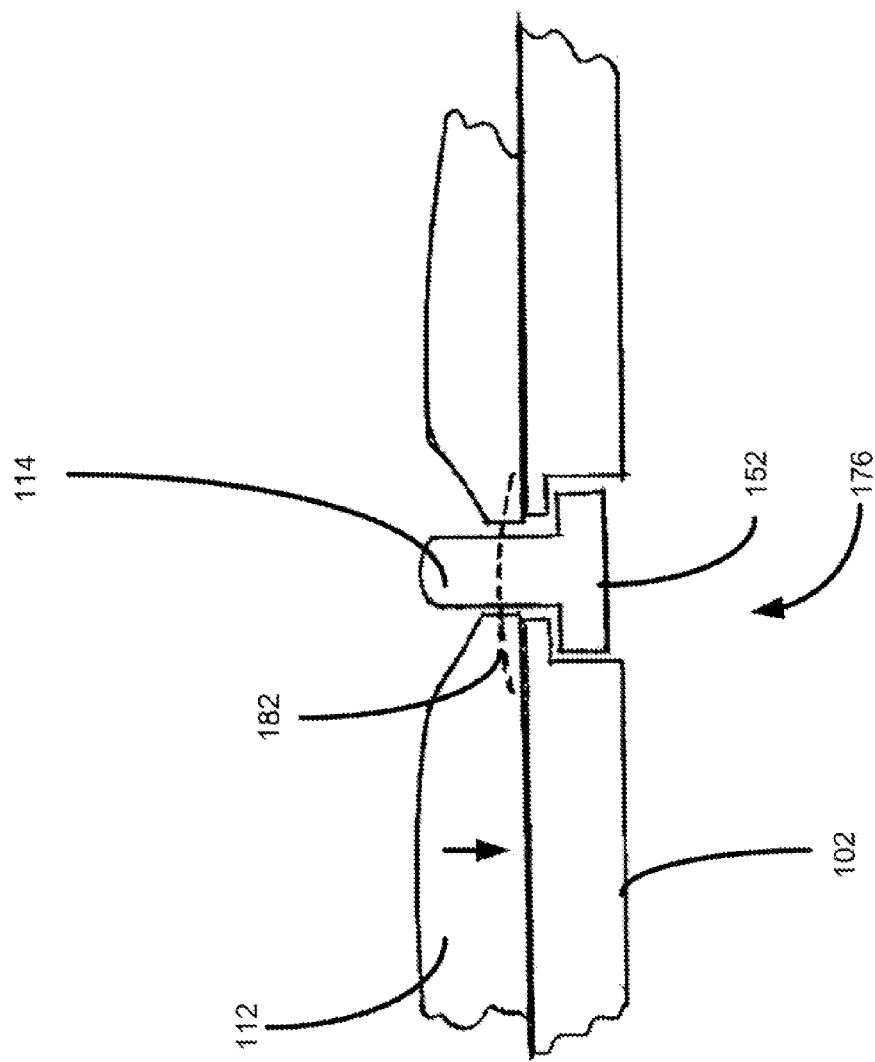
FIG. 9 is a cross sectional view of locking guide and the inner side of the main body of the grip attachment handle.

FIG. 9 is a cross sectional view of locking guide 152 and the inner side 106 of the main body of the grip attachment handle 100. The locking guide 152 is positioned within slot 176. A flat spring 182 may be coupled with the locking guide 152 to bias the locking guide upward. By depressing the push button lock 114, the locking guide may slide within the slot. Releasing the button lock 114 allows the locking guide to rest in the appropriate detent as desired by the user.

Figure 10:
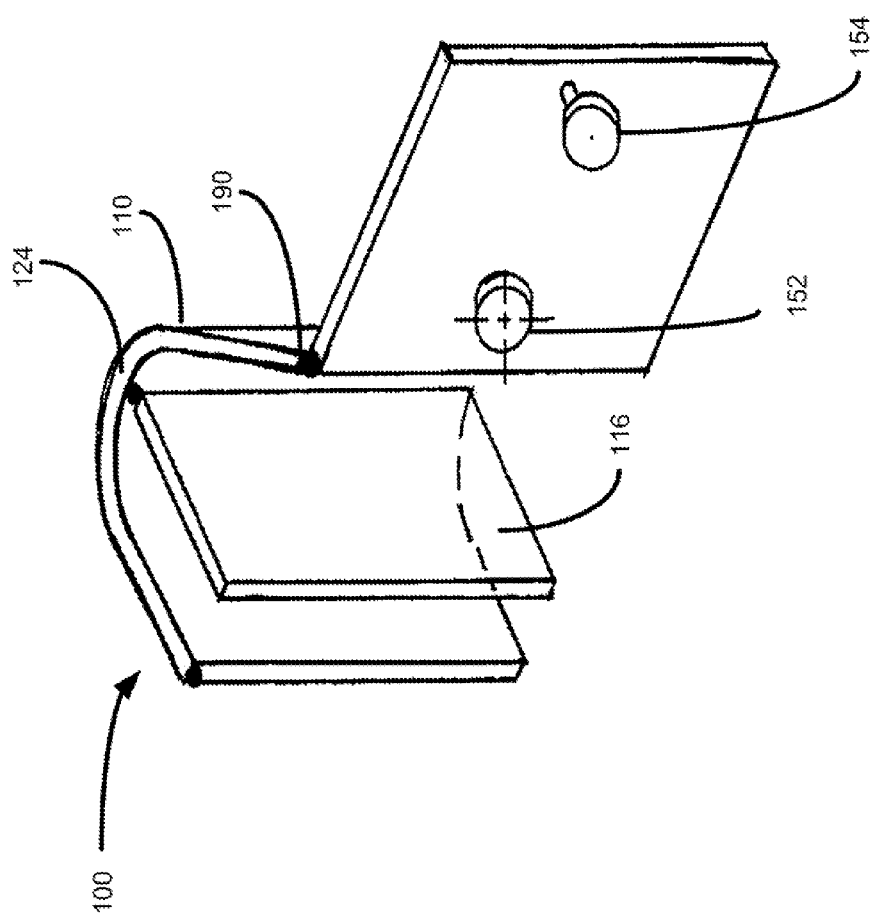
FIG. 10 is a lower view of the flexible grip segment and switch bar.

FIG. 10 is a lower view of the flexible grip segment 110. As depicted in FIG. 10, the locking guide 152 is positioned on the surface of the flexible grip segment. The flexible grip segment may include a pivot point 190 to allow the enlarged grip 124 to be easily formed when the grip segment 110 is slide to the deployed position.

Figure 11:
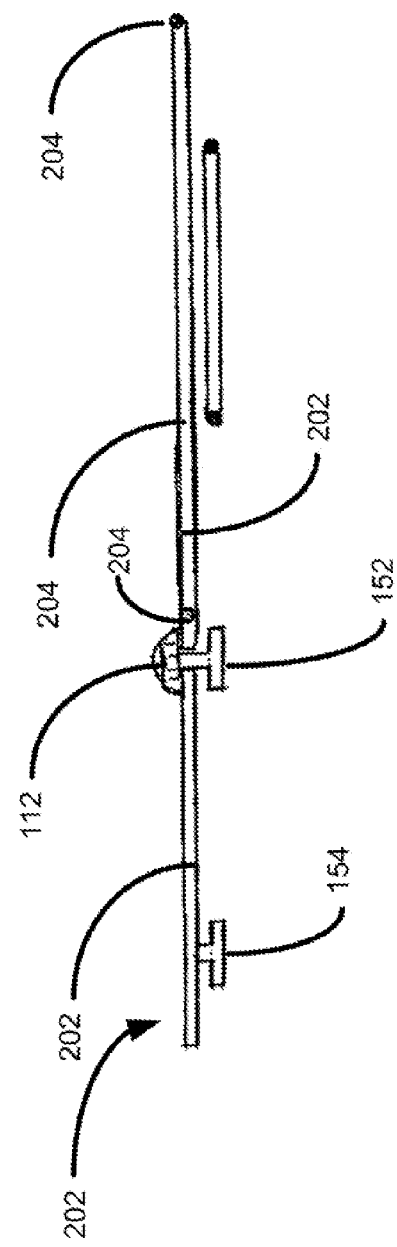
FIG. 11 is a side view of the flexible grip segment in retracted position.

FIG. 11 is a side view of the flexible grip segment 110 in a retracted position. With the flexible grip segment 110 in the retracted position, it provides a substantially flat surface provides ease in carrying the retractable grip attachment 100.

Figure 12:
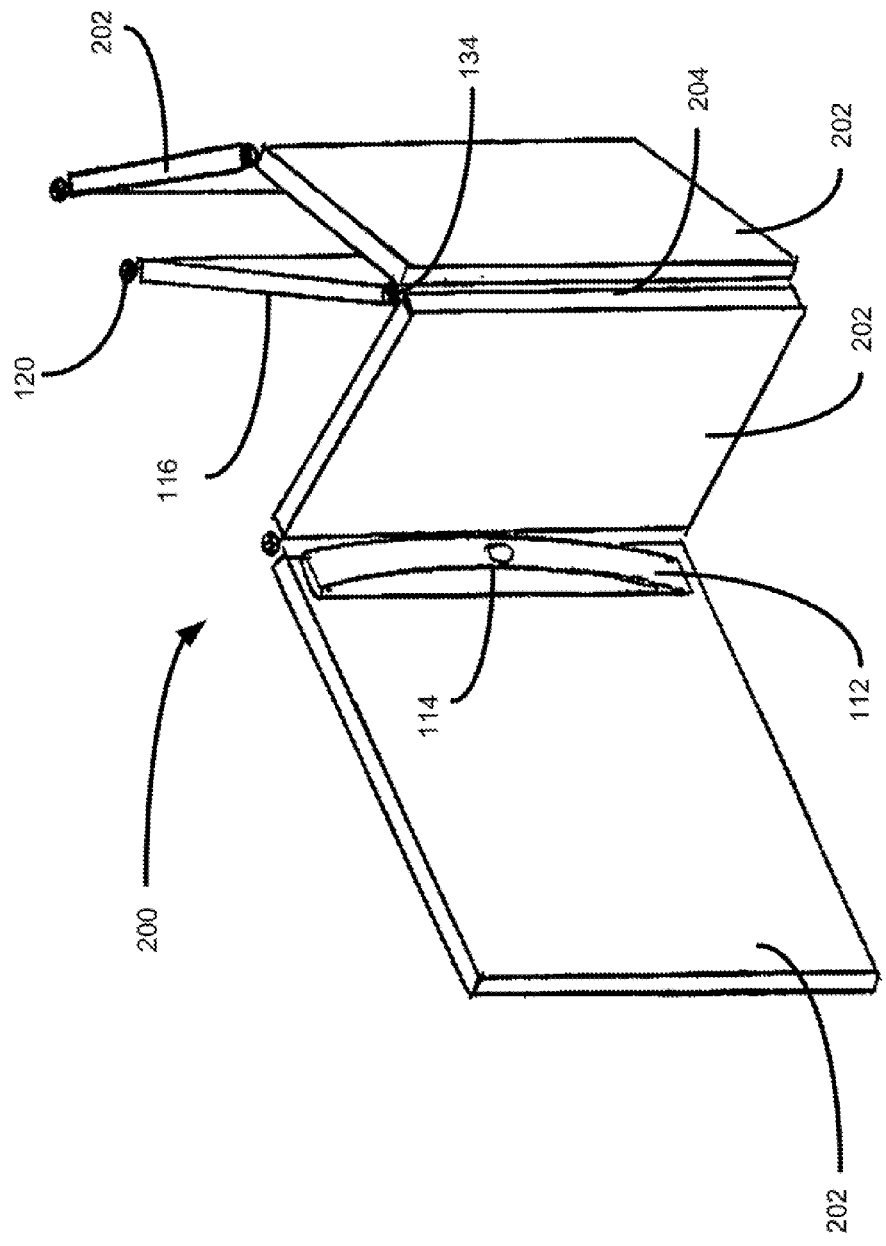
FIG. 12 is a front perspective view of a semi-rigid grip segment in a second embodiment of the present invention.

FIG. 12 is a front perspective view of a semi-rigid grip segment 200 in a deployed position in a second embodiment of the present invention. In this embodiment, the grip segment includes a plurality of flat segments 202 having a bend axis 204 between each segment 202. The semi-rigid grip segment operates in a similar manner as the flexible grip segment 110. Each segment folds to allow the enlarged grip 124 to be deployed when slid toward the first end 122. Any rigid material may be utilized in this embodiment, such as a hard plastic, composite, or ceramic material. In particular, the semi-rigid segment may be constructed, of plastics, wood, composites, ceramic material, metal or any other device which is transmissive to wireless signals such as radio signals, bluetooth, WIFI, and cellular emissions, etc. Additionally, the switch button may be located on top of one of the segments 202 or on a pivotable switch bar 116 which pivots about points 120 and 134. The present invention may utilize various types of hinge technology such as mechanical hinges, extruded materials, composites, or living hinge technology.

With reference to FIGS. 1-12, the operation of the grip attachment 100 will now be explained. The grip attachment may be attached directly to a portion of the chassis mobile phone or to a protective case surrounding the mobile phone. In such an embodiment, an electronic device (not shown), such as a mobile phone, may be seated within the mating area 166 of the main body 102 of the grip attachment handle. However, the grip attachment may be attached in any manner to the electronic device. When the electronic device is positioned within the mating area, the electronic device connects to the mechanical connection 140 (or wireless connection via a Bluetooth or other type of wireless connection). The electronic device may include pins to interface with the pin connection 142 or an audio receptacle to interface with the audio prong 170. The electronic device may download a software application or "app" which enables the interface of the grip attachment 100 with the electronic device.

The grip attachment handle, when installed upon the electronic device has two positions. In the first position, position A, the grip attachment is in the retracted position where the flexible grip segment 110 is in a flat position without the enlarged grip 124. In this position, the electronic device with the grip attachment handle 100 is easy to carry and may fit in a user's pocket. In the second position, position B, the grip attachment is in the deployed position, which enables the flexible grip segment 110 or 200 to form the enlarged grip 124.

In the retracted position, position A, the locking guide 152 is positioned within the front lock detent 178. The locking guide is biased to remain in the front lock detent 178 by the flat spring 182. With the locking guide pressed within the front lock detent 178, the flexible grip segment 110 or semi-rigid grip segment 200 is prevented from moving. When use of the enlarged grip 124 is desired, the user may press the push button lock 114 located on top of the finger bar 112, which releases the locking guide 152 from the front lock detent 178 and enables the locking guide 152 and finger bar 112 to slide to position B with the segment 110 or 200, the deployed position. The finger bar 112 is slid toward the first end 122 by the user's hand. When the locking guide 152 is positioned within the rear lock detent 180, the user may release the push button lock and enable the locking guide to lock in place in the rear lock detent. In this position, the flexible grip segment 110 or 200 forms the enlarged grip 124. Underneath the flexible grip segment is the pivot switch bar 116 which pivots to an extended position, providing both support for the enlarged grip and exposure to the switch button 130.

In the deployed position, the user can now utilize the grip attachment handle 100 for taking photographs. The user may press the switch button 130 to actuate the camera shutter of the camera of the electronic device. Additionally, the switch button may include several buttons or toggles to enable further control of the camera function, such as on/off button and a focusing function. Furthermore, the switch button may be configured to allow a series of pressure taps for various functions with one button.

The user may then take photographs by utilizing the grip attachment. The grip attachment enables the user to grasp the electronic device with one hand and depress the switch button 130 with the same hand. By depressing the switch button, the electronic device's internal camera is activated and the camera captures an image. The switch button may be activated in either the deployed or retracted position.

The grip attachment handle may be attached directly to the electronic device or attached to a case surrounding all or a portion of the electronic device. Thus, the present invention may be used as a separate case or installed on an existing case. In addition, the present invention may be configured in any fashion which enables the enlarged handle to be retracted and deployed by the user and is not limited to the configured shown in FIGS. 1-12.

Although the present invention has been illustrated for use with mobile phones, the present invention may be used with any electronic device utilizing a camera, such as a smart digital device (e.g., mobile phone, digital storage device, pocket camera, portable touch screen device, media players such as the Apple® iPod Touch®, mini tablets, etc.). For example, a grip extension may be attachable to a small sized tablet. Thus, the present invention is not limited to mobile phones. For all the embodiments, the mobile phone or other electronic device is fully functionally while utilizing the grip attachment.

The present invention provides many advantages over existing cases. The present invention provides an easily extendable and retractable grip support to enable the user of an electronic device to easily grasp the electronic device with one hand. The present invention is particularly useful for taking photographs or video with a mobile phone. The present invention may include external controls to control various camera features of the mobile phone, such a shutter release button. Thus, the user may utilize the camera while simultaneously controlling the camera with one hand. Furthermore, the present invention enables the user to deploy or retract the enlarge grip as desired.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A grip attachment for an electronic device, the grip attachment comprising:
   a main body;
   a retractable enlarged grip extension attached to a first end of the main body,
   wherein the main body is attached to the electronic device;
   wherein the enlarged grip extension is sized and shaped to enable a user hand to hold the grip extension and attached electronic device with one hand;
   wherein the main body includes a connector for interfacing with a connector of the electronic device;
   wherein the grip extension includes an external control located on an outer surface of the grip attachment having means for activating a camera control of the electronic device.

2. The grip attachment according to claim 1 wherein the retractable enlarged grip extension includes a flexible grip segment which lies flat in a retracted position and forms an enlarged grip in a deployed position.

3. The grip attachment according to claim 1 wherein the retractable enlarged grip extension includes a plurality of segments which lies flat in a retracted position and forms an enlarged grip in a deployed position.

4. The grip attachment according to claim 1 further comprising a pivotable switch bar.

5. The grip attachment according to claim 1 further comprising a locking mechanism for locking the retractable grip extension in a deployed position.

6. The grip attachment according to claim 1 wherein the connector includes a pin connection for interfacing a pin connector of the electronic device.

7. The grip attachment according to claim 1 wherein the connector includes a wireless connecting mechanism for interfacing wirelessly with the electronic device.

8. The grip attachment according to claim 1 wherein the external control includes a multi-function switch to provide multiple functions from a single switch.

9. The grip attachment according to claim 1 wherein the grip attachment is affixed to a protective case surrounding the electronic device.

10. The grip attachment according to claim 1 wherein the external control is a shutter release button for capturing an image by a camera of the electronic device.

11. The grip attachment according to claim 1 wherein the external control controls zoom of an image captured by a camera of the electronic device.

12. The grip attachment according to claim 1 wherein the main body includes an opening to enable passage of sound to and from the electronic device.

13. A grip attachment for an electronic device, the grip attachment comprising:
   a main body;
   a retractable enlarged grip extension attached to a first end of the main body,
   wherein the main body is attached to the electronic device;
   wherein the enlarged grip extension sized and shaped to enable a user hand to hold the grip extension and attached electronic device with one hand;
   wherein the retractable enlarged grip extension includes a flexible grip segment which lies flat in a retracted position and forms an enlarged grip in a deployed position;
   wherein the main body includes a connector for interfacing with a connector of the electronic device;
   wherein the grip extension includes an external control located on an outer surface of the grip attachment having means for activating a camera control of the electronic device.

14. The grip attachment according to claim 13 further comprising a pivotable switch bar.

15. The grip attachment according to claim 13 further comprising a locking mechanism for locking the retractable grip extension in a deployed position.

16. The grip attachment according to claim 13 wherein the connector includes a mechanical connection for interfacing a pin connector of the electronic device.

17. The grip attachment according to claim 13 wherein the connector includes a wireless connecting mechanism for interfacing wirelessly with the electronic device.

18. A mobile phone and enlarge grip attachment system, the system comprising:
  a mobile phone;
  a grip attachment comprising:
    a main body;
    a retractable enlarged grip extension attached to a first end of the main body,
    wherein the main body is attached to the mobile phone;
    wherein the enlarged grip extension sized and shaped to enable a user hand to hold the grip extension and attached mobile phone with one hand;
    wherein the retractable enlarged grip extension includes a flexible grip segment which lies flat in a retracted position and forms an enlarged grip in a deployed position;
    wherein the main body includes a connector for interfacing with a connector of the mobile phone;
    wherein the grip extension includes an external control located on an outer surface of the grip attachment having means for activating a camera control of the mobile phone.

* * * * *